(12) United States Patent
Lee et al.

(10) Patent No.: US 7,427,579 B2
(45) Date of Patent: Sep. 23, 2008

(54) HYDROGENATION CATALYST, PREPARATION THEREOF, AND METHOD FOR THE PREPARATION OF GAMMA-BUTYROLACTONE FROM MALEIC ANHYDRIDE USING THE CATALYST

(75) Inventors: Jung-Ho Lee, Daejeon (KR); Hyung-Rok Kim, Daejeon (KR); Yo-Han Han, Daejeon (KR); Suk-Jong Jeong, Daejeon (KR); Nak-Mo Choi, Ulsan (KR); Hang-Soo Woo, Ulsan (KR); In-Ki Kim, Ulsan (KR)

(73) Assignees: Ackyung Petrochemical Co., Ltd., Seoul (KR); Korea Research Institute of Chemical Technology, Daejeon (KR)

( * ) Notice: Subject to any disclaimer, the term of this patent is extended or adjusted under 35 U.S.C. 154(b) by 680 days.

(21) Appl. No.: 10/512,041

(22) PCT Filed: Apr. 18, 2003

(86) PCT No.: PCT/KR03/00800

§ 371 (c)(1),
(2), (4) Date: Jun. 9, 2005

(87) PCT Pub. No.: WO03/089125

PCT Pub. Date: Oct. 30, 2003

(65) Prior Publication Data

US 2005/0240033 A1      Oct. 27, 2005

(30) Foreign Application Priority Data

Apr. 22, 2002    (KR) .................. 10-2002-0022029

(51) Int. Cl.
*B01J 21/06*    (2006.01)
*B01J 21/08*    (2006.01)
*C07C 307/00*   (2006.01)

(52) U.S. Cl. .............. 502/232; 502/233; 502/234; 502/240; 502/243; 502/244; 502/250; 502/253; 549/325

(58) Field of Classification Search .............. 502/243, 502/244, 232, 233, 234, 240, 250, 253; 549/325
See application file for complete search history.

(56) References Cited

U.S. PATENT DOCUMENTS

| 5,294,583 | A | * | 3/1994 | Pohl et al. ............ 502/232 |
| 5,347,021 | A | | 9/1994 | Taylor et al. |
| 5,536,849 | A | | 7/1996 | Bergfeld et al. |
| 5,698,713 | A | | 12/1997 | Lancia et al. |
| 6,008,375 | A | | 12/1999 | Bergfeld et al. |
| 2003/0042646 | A1 | * | 3/2003 | Khare et al. ............ 264/117 |

FOREIGN PATENT DOCUMENTS

| EP | 0528305 | 2/1993 |
| EP | 0559053 | 9/1993 |
| EP | 0591795 | 4/1994 |
| EP | 332140 | 8/1997 |
| GB | 1168220 | 10/1969 |
| KR | 2002-8600 | 1/2002 |

* cited by examiner

*Primary Examiner*—Elizabeth D Wood
(74) *Attorney, Agent, or Firm*—Pearl Cohen Zedek Latzer LLP

(57) ABSTRACT

The present invention relates to a hydrogenation catalyst represented by the following formula 1, a method for the preparation thereof, and a method for preparing gamma-butyrolactone using this catalyst. The method for preparing gamma-butyrolactone from maleic anhydride using the catalyst of the invention prepared by stabilizing the precursor particles of copper oxide, zinc oxide, and manganese oxide with a silica exhibits high selectivity, high yield, and high productivity under the operation conditions of a low molar ratio of hydrogen with regard to the reactants, and enables the preparation of gamma-butyrolactone from maleic anhydride with long-term stability without requiring frequent re-activation of the catalyst: Formula (I) $CuO(a)ZnO(b)MnO_2(c)SiO_2(d)$ wherein a, b, c, and d are represented on the basis of weight, wherein a is 20 to 90, b is 0.01 to 10, c is 0.01 to 5, and d is 5 to 50.

15 Claims, No Drawings

HYDROGENATION CATALYST, PREPARATION THEREOF, AND METHOD FOR THE PREPARATION OF GAMMA-BUTYROLACTONE FROM MALEIC ANHYDRIDE USING THE CATALYST

BACKGROUND OF THE INVENTION (a) Field of the Invention

The present invention relates to a hydrogenation catalyst for use in the preparation of gamma-butyrolactone (GBL) from maleic anhydride (MAn), a method for the preparation thereof, and a method for preparing gamma-butyrolactone using the catalyst. More particularly, it relates to a catalyst useful for hydrogenation in the preparation of gamma-butyrolactone from maleic anhydride and a method for preparing gamma-butyrolactone from maleic anhydride using the catalyst under the mild reaction conditions of low temperature, low pressure, and a low molar ratio of hydrogen/maleic anhydride with high selectivity, high yield, and long-term stability.

(b) Description of the Related Art

Gamma-butyrolactone is a synthetic intermediate of solvents such as pyrrolidone or N-methylpyrrolidone. It is also the raw material for the production of N-vinylpyrrolidone, polyvinylpyrrolidone, butanediol, tetrahydrofuran, pharmaceuticals, and rubber additives for use in petrochemicals and electronic industries.

As conventional methods for the preparation of gamma-butyrolactone, there are dehydrogenation of butanediol and direct hydrogenation of maleic anhydride. Recently, as methods for preparing gamma-butyrolactone by the vapor phase hydrogenation of maleic anhydride in the presence of a catalyst have been operated with a low cost, numerous catalysts and processes using them have been developed.

As catalysts for the vapor phase hydrogenation of maleic anhydride, those comprising copper as a main component are mostly used. For example, U.S. Pat. No. 3,065,713 proposed a Cu—Cr catalyst, but as selectivity and conversion rate into gamma-butyrolactone are low, it has problems of recovering and recycling a considerable amount of unreacted succinic anhydride. To solve such problems of Cu—Cr catalyst, U.S. Pat. No. 5,698,713 and European Patent No. 332,140 proposed a Cu—Zn—Cr catalyst and a Cu—Zn—Cr—Al catalyst, respectively, but they are still unsatisfactory in catalytic performance, long-term stability, and productivity of gamma-butyrolactone. In U.S. Pat. No. 5,536,849, high selectivity for gamma-butyrolactone was obtained using a catalyst comprising CuO—Cr$_2$O$_3$—SiO$_2$ prepared by activating Cu, Cr, and Si, but as its long-term stability is low, it still needs improvement. Also, so as to solve the handling problems of chrome-containing waste catalysts and to improve their performance, U.K. No. 1,168,220 proposed a reduced Cu—Zn catalyst, but its effect on performance improvement is low as compared with Cu—Cr catalysts.

Further, U.S. Pat. No. 5,347,021 disclosed that gamma-butyrolactone was prepared using a catalyst comprising a Cu—Zn—Al oxide with comparatively high selectivity and yield and long-term stability, but it has drawbacks—it requires the regeneration of catalyst at a high temperature after the lapse of a certain time from the time the reaction is initiated, and thereafter, re-activation should be done frequently to maintain the activity of the catalyst. It was operated in a high molar ratio of not less than 200:1 of hydrogen to maleic anhydride, thus being not advisable in an economical aspect. U.S. Pat. No. 6,008,375 disclosed a catalyst comprising CuO-Al$_2$O$_3$— graphite that has high selectivity and yield for gamma-butyrolactone and long-term stability, but in order to apply the process to industrial-scale production, there are still required mild reaction conditions such as a low reaction temperature and low molar ratio of hydrogen with regard to reactants, and a high productivity.

As described above, the direct hydrogenation process of maleic anhydride has problems of frequent re-activation due to the cocking of catalysts, low selectivity, low conversion rate of catalysts due to the sintering of catalysts, and a short lifetime of catalysts. Further, in the industrial aspect, the vapor phase hydrogenation process of maleic anhydride has environmental problem because catalysts containing a chrome component are employed in a large quantity. In addition, the vapor phase hydrogenation process for preparing gamma-butyrolactone should be operated under conditions of an excessively high molar ratio of hydrogen to maleic anhydride, it has comparatively low productivity, and it needs improvement in view of selectivity and conversion rate into gamma-butyrolactone.

To solve such problems of the prior arts, it was provided a Cu—SiO$_2$ catalyst by stabilizing nanosized copper oxide (CuO) precursor particles with a colloidal silica and described in the Korean Intellectual Property Office (Korean Patent Application No. 2000-42410; Laid-Open No. 2002-8600). However, pilot plant operation using such catalyst revealed that when it was operated with a low molar ratio of hydrogen to the reactants, the catalytic activity was sensitive to changes in conditions such as reaction temperature, pressure, etc., thereby complicating the operation conditions, and butanoic acid was excessively generated as a result of reaction making the purification of gamma-butyrolactone difficult in the purification process, thereby reducing purification efficiency.

SUMMARY OF THE INVENTION

The object of the present invention is thus to provide a catalyst for the preparation of gamma-butyrolactone by the vapor phase hydrogenation of maleic anhydride, which is thermally stable and shows high activity, which is prepared by stabilizing copper oxide (CuO), zinc oxide (ZnO) and manganese oxide (MnO) with a nanosized silica, and a method for the preparation thereof.

Therefore, it is an object of the present invention to provide a catalyst for vapor phase hydrogenation of maleic anhydride, which is thermally stable and shows high activity, for use in the preparation of gamma-butyrolactone from maleic anhydride, prepared by stabilizing copper oxide (CuO), zinc oxide (ZnO) and manganese oxide (MnO) with a nanosized silica, and a method for the preparation thereof.

It is another object of the invention to provide a method for preparing gamma-butyrolactone from maleic anhydride using such vapor phase hydrogenation catalyst.

In order to achieve the aforementioned objects, the present invention provides a hydrogenation catalyst represented by the following formula 1, for use in the preparation of gamma-butyrolactone from maleic anhydride, a method for the preparation thereof, and a method for preparing gamma-butyrolactone using the catalyst:

CuO(a)ZnO(b)MnO$_2$(c)SiO$_2$(d)　　　　　　　　　Formula 1 wherein a, b, c, and d are represented on the basis of weight, wherein a is 20 to 90, b is 0.01 to 10, c is 0.01 to 5, and d is 5 to 50.

DETAILED DESCRIPTION OF THE PREFERRED EMBODIMENTS

This invention will hereafter be described in more detail.

The hydrogenation catalyst for use in the preparation of gamma-butyrolactone from maleic anhydride, represented by formula 1 above, has a copper-silica as a main component and comprises zinc and manganese oxides.

The catalyst comprises the copper oxide in a range of 20 to 90% by weight, and preferably 40 to 80% by weight. Zinc and manganese oxides have a role in suppressing over-hydrogenation by reducing the activity of copper oxide, and the zinc oxide is contained in a range of 0.01 to 10% by weight, and preferably 0.5 to 7% by weight, while the manganese oxide is contained in a range of 0.001 to 5% by weight, and preferably 0.01 to 2% by weight. The zinc oxide used herein is added for the purpose of promoting the copper component, and it is distinguished from zinc in conventional CuO/ZnO catalysts.

The silica used in the method of the present invention has a role in stabilizing copper, zinc, and manganese oxides, and the content of silica (d) in the catalyst has a value within a range of 5 to 50% by weight, and preferably 10 to 40% by weight.

Also, the invention provides a method for the preparation of a hydrogenation catalyst of the following formula 1:

$$CuO(a)ZnO(b)MnO_2(c)SiO_2(d) \quad \text{Formula 1}$$

wherein a, b, c, and d are represented on the basis of weight, wherein a is 20 to 90, b is 0.01 to 10, c is 0.01 to 5, and d is 5 to 50; and comprising (1) coprecipitating copper, zinc, and manganese components into the form of hydro gel by applying an aqueous alkali solution to a mixed aqueous solution of copper salt, zinc salt, and manganese salt; (2) adding a nanosized silica to the thus produced coprecipitate; (3) hydrothermally aging the slurry mixture; and selectively (4) filtering the aged slurry solution to isolate a precipitate and rinsing it; and (5) drying and forming the dried powder.

More particularly, the process for the preparation of the catalyst represented by formula 1 above is as follows.

(1) Preparation of Mixed Solution and Coprecipitation

The hydrogenation catalyst of the invention is prepared by mixing copper, zinc, and manganese, which are the compositional components, with aqueous salts such as nitrate or chloride dissolved in water, and then coprecipitating them. It cannot be prepared by conventional methods for the preparation of catalysts comprising impregnating a silica carrier therewith. It is preferred that the concentration of the aqueous salts is in the range of 5~25% by weight, respectively, and that the temperature of the slurry solution is maintained constantly within the range of 1~30° C. so that it can maintain a form of hydro gel when coprecipitated.

The aqueous alkali solution used in the invention is employed as a coprecipitant, to coprecipitate copper, zinc, and manganese components into the form of a mixed hydroxide or hydroxy carbonate. Examples thereof include aqueous solutions of sodium hydroxide, sodium carbonate, sodium bicarbonate, ammonium carbonate, and ammonium bicarbonate. The coprecipitant is used in such an amount that the pH of the slurry solution prepared is maintained in a range of 6 to 9.

(2) Addition of Silica to Slurry Solution

In this step, a slurry mixture is prepared by adding a nano-sized silica to the coprecipitate thus produced. The silica used in this invention includes a colloidal silica, silica sol, or water glass, and of them, the colloidal silica is preferable. In particular, a colloidal silica having a particle size of 4 to 60 nanometers which is stabilized with ammonia or sodium and has a pH of 8 to 10 and a surface area of 100 to 600 m²/g is most preferable.

The silica can be used within an amount of 5~50% by weight, and preferably 10~40% by weight of the final catalyst, in an oxide form.

Any colloidal silica can be used if it is stabilized with ammonium ions ($NH_4^+$) or sodium ions ($Na^+$), or other alkali metals, and it has a particle size of 4~60 nm, a surface area of 100~600 m²/g, and a concentration within 1 to 60% by weight on the basis of the silica. Ludox (Dupont Co.), Nalcoag (Nalco Co.), Snowtex (Nissan Chemical Co.), and so on are examples thereof.

(3) Hydrothermal Aging

The mixed silica slurry solution is hydrothermally aged at 50-100° C. for 0.5 hours or longer.

The catalytic components in the form of hydroxide are crystallized into the form of an oxide mixture having crystallinity during hydrothermal aging procedures in the presence of nanosized silica particles, wherein the nanosized silica particles have a main role in regulating the crystal size of the catalytic components. At the same time, the silica particles have a role in agglomerating catalytic particles by their gelation and thus facilitate post-treatment procedures such as rinsing. The catalysts prepared according to the method of the invention by using the nanosized silica particles are nano-bar type crystalline particles having a copper oxide crystal diameter of 50 nm or less as determined using X-ray diffraction spectroscopy (XRD) by X-ray line broadening analysis, their BET specific surface area is 80 m²/g or larger, and they are thermally stable.

(4) Isolation and Rinsing

After the aged slurry solution is filtered, the precipitate is isolated and rinsed with deionized water to eliminate excess sodium or ammonium ions and anions. The concentration of the cationic alkali ions used as the stabilizer of colloidal silica and the coprecipitate is controlled to become 1000 ppm or less, and preferably 500 ppm or less, based on the dried catalytic particles.

(5) Drying and Forming

The catalytic substances thus obtained are formed after being dried at 100 to 200° C. for 3 to 30 hours.

The forming method is chosen according to the particle size, shape and bulk density, and the impregnation amount of active catalytic components, etc. in the final formed catalyst. There are extrusion, tableting, impregnation methods, and so on. For example, the precipitated cake is obtained, dried such that its hydration ratio is in the range of 45-50%, and then it is directly formed by extrusion, or it may be formed by tableting the powder that is obtained using spray-drying or it may be formed by impregnating it onto carriers having huge pores.

The formed catalyst is calcined at 200 to 900° C. and preferably, 300 to 750° C., for 2 to 10 hours. In the case of applying the catalyst in the form of calcined oxide to hydrogenation, it is advisable to use it after it is activated with hydrogen or hydrogen-containing gas at 150 to 450° C. for 1 to 20 hours. In general, such activation step is operated by feeding the catalyst in the form of calcined oxide to a reactor and by flowing hydrogen or hydrogen-containing gas that is diluted with nitrogen or argon, wherein the hydrogen concentration, the flow amount of gas, the rate of temperature increase and so on should be carefully controlled so that the catalyst is not sintered by the heat generated in the course of its reduction.

The invention provides a method for preparing gamma-butyrolactone by hydrogenating maleic anhydride using the hydrogenation catalyst of formula 1, prepared as above.

The vapor phase hydrogenation of maleic anhydride should be carried out in a fixed tube-type reactor under conditions enabling the preparation of gamma-butyrolactone at a conversion rate of maleic anhydride and succinic anhydride of 90% or more, and preferably at a conversion rate of 98% or more; and selectivity of 80% or more, and preferably 90 to 95% or more. This is because when the conversion rate is low, the reactor and product collector are blocked by unreacted succinic anhydride, thereby causing a severe trouble to the process operation.

To prevent such problems, the process is carried out at a reaction temperature of 200 to 400° C., and preferably 220 to 350° C., and at a reaction pressure of 1 to 20 atmospheres, and preferably 1 to 10 atmospheres.

If the reaction is carried out at a temperature higher than the above range, a high conversion rate and reaction productivity can be achieved, but as the produced gamma-butyrolactone is consecutively hydrogenated, byproducts such as butanol, tetrahydrofuran, and butanoic acid are generated and thus selectivity is largely decreased, and the catalyst itself is deteriorated and thus may be inactivated. Also, if the reaction is carried out at a temperature lower than the above range, the conversion rate is substantially decreased and the catalyst may be inactivated due to the deposition of high-boiling byproducts. Further, if the reaction is carried out at a higher reaction pressure than the above range, a high conversion rate is achieved, but a degree of over-hydrogenation is severe and thus the fraction of byproducts such as butanol, propanol, tetrahydrofuran, etc. is increased, thereby being not advisable, and at a low pressure of not higher than 1 atmosphere, the conversion rate is very low.

The method for preparing gamma-butyrolactone from maleic anhydride according to the invention is carried out at a remarkably low pressure as compared with the prior method that was carried out at a reaction pressure of 50 to 100 atmospheres, that is, at between 1 and 20 atmospheres, and accordingly the process operation is convenient and economical.

In the method for preparing gamma-butyrolactone from maleic anhydride using the catalyst according to the invention, an impregnated catalyst is used in the inlet portion of a tube-type reactor so as to eliminate the reaction heat effectively. In the preparation of gamma-butyrolactone from maleic anhydride, the reaction heat is about 59 Kcal/mol, and the effective elimination of such reaction heat in the vapor phase process is important in view of the prevention of the deactivation of the catalyst, the maintaining of selectivity, the maintaining of low molar ratio of hydrogen with regard to maleic anhydride, and the stability of operation.

The above impregnated catalyst is prepared by impregnating a carrier having a porosity of not less than 40% and a specific surface area of not more than 1 m$^2$/g with the powder, which is the calcined component of the catalyst represented by formula 1 above, in an amount of 5 to 40% by weight, preferably 5 to 20% by weight. As the carrier, alumina-silicate, alumina, zirconia, etc. can be used. The impregnated catalyst thus prepared is used by feeding it to the inlet portion of a reactor, for the purpose of eliminating the reaction heat that occurs during hydrogenation, and it is fed in an amount of 1/10 to 1/2, preferably 1/7 to 1/3 of the height of the total catalyst layer.

The maleic anhydride is reacted by supplying it to the heated reaction space in a suitable amount and vaporizing it, or it is supplied to the reactor after being vaporized through a spray nozzle in an evaporator using the hydrogen used in the reaction. As the reactant to be supplied to the evaporator, there can be used a molten maleic anhydride at about 80° C. or a gamma-butyrolactone solution containing 20 to 70 wt. % of maleic anhydride, which is prepared by dissolving the maleic anhydride in the product.

It is advisable that the molar ratio of hydrogen with regard to maleic anhydride is high, in view of the maintaining of the high activity and high selectivity of the catalyst, the improvement of productivity and the acceleration of the vaporizing maleic anhydride, but as it involves high costs in the recovery and re-use of excess hydrogen, a preferred molar ratio of hydrogen/maleic anhydride is 20:1 to 100:1, and more preferably 25:1 to 60:1.

The invention will be more fully understood by virtue of the following examples, which are provided solely to illustrate the invention but are not to be construed as limiting the protection scope of the invention as defined by the appended claims.

EXAMPLES

Preparation Example 1

Preparation of Catalyst 1 [CuO(69.5)ZnO(5)MnO$_2$(0.5)SiO$_2$(25)]

16 wt. % Aqueous sodium hydroxide solution was slowly added to the mixed solution of 400 g of Cu(NO$_3$)$_2$3H$_2$O, 34.6 g of Zn(NO$_3$)$_2$6H$_2$O, and 3.21 g of Mn(NO$_3$)$_2$6H$_2$O dissolved in 3 L of distilled water and coprecipitated to prepare a slurry solution. To the slurry solution was added 158 g of colloidal silica solution (Ludox SM-30, containing Silica 30 wt. %), which was then aged at 80° C. for 6 hours. The precipitated slurry solution was sufficiently washed with distilled water to eliminate sodium, and filtered. The filtered cake was dried at 40~60° C. until its hydration ratio became 45~50%, and then formed by extrusion. The solids formed by extrusion were dried at 120° C. for 12 hours and then calcined at 550° C. for 5 hours to thereby prepare a catalyst in the state of oxide having the title composition.

The thus obtained catalyst oxide was analyzed by XRD, and as a result, the crystal size of copper oxide (CuO) was 5 nm and its BET specific surface area was 205 m$^2$/g.

Preparation Example 2

Preparation of Catalyst 2 [CuO(69.5)ZnO(5)MnO$_2$(0.5)SiO$_2$(25)]

The catalytic powder having the same composition as that of Catalyst 1 of Preparation Example 1 was prepared, but a catalytic powder having 20 wt. % of silica was first prepared and then an oxide of the catalyst having the title composition was prepared by adding a colloidal silica aqueous solution (Ludox AS-40, an ammonium-stabilized type, containing 40 wt. % of silica) thereto in an amount equivalent to 5 wt. % of silica and ball-milling it, and then it was impregnated onto an alumina-silicate carrier of a 5 mm size having a porosity of 50% and a specific surface area of not more than 1 m$^2$/g (impregnation rate: 11 wt. %), dried, and calcined at 550° C. for 5 hours to thereby prepare a catalyst in an impregnated form.

Example 1

Vapor Phase Hydrogenation of Maleic Anhydride (MAn)

After 144 ml of Catalyst 1 of Preparation Example 1 was charged into the lower portion of a stainless reactor having an inside diameter of 1 inch and a length of 1.2 m and 36 ml of Catalyst 2 was charged into the upper portion of the reactor, they were slowly heated by flowing a 5% H$_2$/N$_2$ mixed gas so that hot spots above 10° C. than reactor temperature did not occur, and then reduced at 300° C. for 12 hours. Thereafter, the temperature of the reactor was lowered, and 60 wt. % of maleic anhydride containing gamma-butyrolactone solution was introduced as a mixed gas, which was prepared by spray-evaporating the maleic anhydride solution with hydrogen gas in an evaporator, while the mixed gas was supplied from the upper portion of the reactor. The performance results of the catalyst according to the change in reaction conditions are shown in Table 1.

TABLE 1

| Reaction Time (hr) | WHSV (hr⁻¹) | H₂/MAn (molar ratio) | Reaction Temperature (° C.) | Reaction pressure (atmospheric pressure) | With regard to SAn Conversion Rate (%) | GBL Selectivity (%) | Selectivity (%) with regard to SAn | | | | | | |
|---|---|---|---|---|---|---|---|---|---|---|---|---|---|
| | | | | | | | PrAL | PrOH | BuAL | THF | BuOH | PrA | BuA |
| 24 | 0.1 | 35 | 255.2 | 1 | 98.97 | 96.75 | — | 0.25 | 0.01 | 0.83 | 0.89 | 0.58 | 0.69 |
| 200 | 0.1 | 35 | 254.1 | 2 | 99.61 | 96.52 | — | 0.11 | — | 1.58 | 0.88 | 0.22 | 0.70 |
| 300 | 0.1 | 45 | 254.2 | 2 | 99.20 | 96.56 | — | 0.12 | — | 1.27 | 1.10 | 0.20 | 0.76 |
| 335 | 0.1 | 35 | 251.3 | 3 | 99.75 | 95.57 | — | 0.09 | — | 2.54 | 0.93 | 0.19 | 0.68 |
| 365 | 0.1 | 45 | 251.5 | 3 | 99.66 | 95.74 | — | 0.16 | — | 2.0 | 1.38 | 0.19 | 0.53 |
| 390 | 0.1 | 55 | 251.1 | 3 | 99.54 | 95.98 | — | 0.22 | 0.01 | 1.46 | 1.73 | 0.12 | 0.48 |
| 432 | 0.1 | 55 | 254.5 | 2 | 99.03 | 96.48 | — | 0.22 | — | 0.99 | 1.59 | 0.16 | 0.56 |

The abbreviations used in the above Table are as follows: WHSV: weight hourly space velocity; SAn: succinic anhydride; PrAL: propionaldehyde; PrOH: propanol; BuAL: butylaldehyde; THF: tetrahydrofuran; BuOH: butanol; PrA: propionic acid; BuA: Butanoic acid; GBL: gamma-butyrolactone. The conversion rate is represented on the basis of the amount of succinic anhydride (SAn), which is the first hydrogenation product, in order to indicate the degree of hydrogenation in a consecutive reaction, and the conversion rate of maleic anhydride itself showed to be almost 100%.

Comparative Preparation Example 1

Preparation of Catalyst CuO(76.5)SiO₂(23.5)

The catalyst having the above title composition was prepared according the same procedures as used in Preparation Example 1, except that only copper oxide was used as a parental component.

Comparative Example 1

Vapor Phase Hydrogenation of Maleic Anhydride

The vapor phase hydrogenation of maleic anhydride was carried out in the same manner as in Example 1, using the catalyst obtained in Comparative Preparation Example 1, and the results are exhibited in Table 2.

of the reaction conditions was severe, and its selectivity was reduced under the operation conditions of high conversion rate above 99%, as compared with the hydrogenation catalyst of the invention, CuO(a)ZnO(b)MnO₂(c)SiO₂(d).

Comparative Preparation Example 2

Preparation of Catalyst CuO(64)ZnO(23.5)SiO₂(12.5)

The catalyst having the above title composition was prepared according the same procedures as used in Preparation Example 1, except that only two components, copper oxide and zinc oxide, without manganese oxide, were used as a parental component.

Comparative Example 2

Vapor Phase Hydrogenation of Maleic Anhydride

The vapor phase hydrogenation of maleic anhydride was carried out in the same manner as in Example 1, using the catalyst obtained in Comparative Preparation Example 2.

As a result of the reaction that was conducted in a reactor having an inside diameter of ½" at a space velocity WHSV of 0.08 hr⁻¹, an H₂/MAn molar ratio of 30, and a reaction temperature of 250° C., the selectivity of succinic anhydride was 36.5% and the selectivity of gamma-butyrolactone was 58.4% at a 100% conversion rate of maleic anhydride. From

TABLE 2

| Reaction Time (hr) | WHSV (hr⁻¹) | H₂/MAn (molar ratio) | Reaction Temperature (° C.) | Reaction Pressure (atmospheric pressure) | With regard to SAn Conversion Rate (%) | GBL Selectivity (%) | Selectivity with regard to SAn (%) | | | | | | |
|---|---|---|---|---|---|---|---|---|---|---|---|---|---|
| | | | | | | | PrAL | PrOH | BuAL | THF | BuOH | PrA | BuA |
| 24 | 0.05 | 35 | 250.8 | 1 | 100 | 92.77 | 0.01 | 0.31 | 0.08 | 2.21 | 2.90 | 0.20 | 1.51 |
| 72 | 0.05 | 35 | 253.3 | 1 | 93.7 | 96.24 | — | 0.06 | 0.02 | 1.13 | 0.55 | 0.89 | 1.10 |
| 120 | 0.05 | 35 | 253.3 | 2 | 99.69 | 92.50 | 0.01 | 0.28 | 0.07 | 2.88 | 2.41 | 0.38 | 1.47 |
| 620 | 0.1 | 35 | 254.7 | 2 | 99.28 | 94.50 | — | 0.13 | 0.03 | 2.32 | 0.95 | 0.72 | 1.35 |
| 1340 | 0.1 | 35 | 255.2 | 2 | 97.87 | 95.65 | — | 0.05 | 0.02 | 2.08 | 0.48 | 0.78 | 0.94 |
| 1350 | 0.1 | 45 | 255.5 | 2 | 98.83 | 95.32 | — | 0.07 | 0.02 | 2.07 | 0.69 | 0.61 | 1.21 |
| 1460 | 0.1 | 55 | 255.2 | 2 | 99.83 | 93.94 | — | 0.2 | 0.05 | 1.88 | 2.02 | 0.3 | 1.59 |

From Table 1 and Table 2 above, it can be seen that in catalyst CuO(76.5)SiO₂(23.5) according to the prior arts, it took a long time for its catalytic activity to be stabilized, the change in conversion and selectivity according to the change these results, it can be seen that the selectivity of gamma-butyrolactone and succinic anhydride was comparatively low due to excessive addition of the zinc component as a parental component.

As fully described in the above, the method for preparing gamma-butyrolactone from maleic anhydride using the catalyst of the present invention exhibits high selectivity, high yield, and high productivity under mild reaction conditions; it enables the preparation of gamma-butyrolactone from maleic anhydride with long-term stability without requiring frequent re-activation of the catalyst; it also enables a stable operation under the operation conditions of a low molar ratio of hydrogen with regard to the reactants because the catalytic activities are not sensitive to the change of the operation variables; it has excellent practicability; and it is environmentally friendly because it does not use chrome.

What is claimed is:

1. A hydrogenation catalyst represented by formula 1:

$$CuO(a)ZnO(b)MnO_2(c)SiO_2(cf) \quad (1)$$

wherein a, b, c, and d are represented on the basis of weight, wherein a is 20 to 90, b is 0.01 to 10, c is 0.01 to 5, and d is 5 to 50.

2. A method for the preparation of a hydrogenation catalyst represented by formula 1:

$$CuO(a)ZnO(b)MnO_2(c)SiO_2(cf) \quad (1)$$

wherein a, b, c, and d are represented on the basis of weight, wherein a is 20 to 90, b is 0.01 to 10, c is 0.01 to 5, and d is 5 to 50, the method comprising the steps of:

(1) coprecipitating copper, zinc, and manganese components into the form of hydrogel by preparing a mixed aqueous solution of copper salt, zinc salt, and manganese salt and then applying an aqueous alkali solution thereto;

(2) adding a nanosized silica to the thus produced coprecipitate;

(3) hydrothermally aging the slurry mixture; and selectively, (4) filtering the aged slurry solution to isolate a precipitate and rinsing it; and (5) drying and forming the rinsed precipitate.

3. The method of claim 2 characterized in that the temperature of the slurry solution of (1) is in the range of 1 to 30° C. and its pH is maintained in the range of 6 to 9.

4. The method of claim 2 characterized in that the nanosized silica of (2) is a colloidal silica and the colloidal silica is stabilized with ammonium ions (NrV) or sodium ions (Na+), or other alkaii metals, and it has a particle size of 4-60 nm, a surface area of 100-600 mVg, and a concentration within 1 to 60% by weight on the basis of the silica.

5. The method of claim 2 characterized in that the aging process of (3) is carried out at 50 to 100° C. for 0.5 hours or longer.

6. The method of claim 2 characterized in that in the rinsing of (4), the remaining amount of alkai metals is regulated in an amount of 1000 ppm or less.

7. The method of claim 2 characterized by further comprising a process of calcining the formed catalyst at 200 to 900° C. for 2 to 10 hours.

8. The method of claim 2 characterized in that in step (5), the dried parental powder is impregnated onto a carrier having a porosity of not less than 40% and a specific surface area of not more than 1 m*/g, in an amount of 5 to 40% by weight.

9. The method of claim 2 characterized in that in step (5), the precipitated cake is obtained and then directly formed by extrusion such that its hydration ratio is within a range of 45 to 50%.

10. The method of claim 2 characterized in that in step (5), the powder, which is obtained after spray drying, is formed by tableting it.

11. A method for preparing gamma-butyrolactone by hydrogenating maleic anhydride in the presence of a catalyst represented by formula 1:

$$CuO(a)ZnO(b)MnO_2(c)SiO_2(cf) \quad (1)$$

wherein a, b, c, and d are represented on the basis of weight, wherein a is 20 to 90, b is 0.01 to 10, c is 0.01 to 5, and d is 5 to 50.

12. The method of claim 11 characterized in that the catalyst in an impregnated form is fed to the inlet portion of a reactor in a range of 1/10 to 1/2 of the total catalyst layer.

13. The method of claim 11 characterized in that before the hydrogenation, the catalyst is activated with hydrogen or a hydrogen-containing gas at 150 to 450° C. for 1 to 20 hours.

14. The method of claim 11 characterized in that the hydrogenation is carried out under the conditions of a reaction pressure of 1 to 20 atmospheres, a reaction temperature of 200 to 400° C., and a molar ratio of hydrogen with regard to maleic anhydride of 20:1 to 100:1.

15. The method of claim 11 characterized in that the maleic anhydride is supplied in the evaporated form of a molten maleic anhydride or a gamma-butyrolactone solution containing 20 to 70 wt. % of maleic anhydride.

* * * * *